R. & F. KUHN & F. E. SHAILOR.
ELECTRIC HEATER.
APPLICATION FILED JUNE 11, 1910.
1,006,104.
Patented Oct. 17, 1911.
2 SHEETS—SHEET 1.
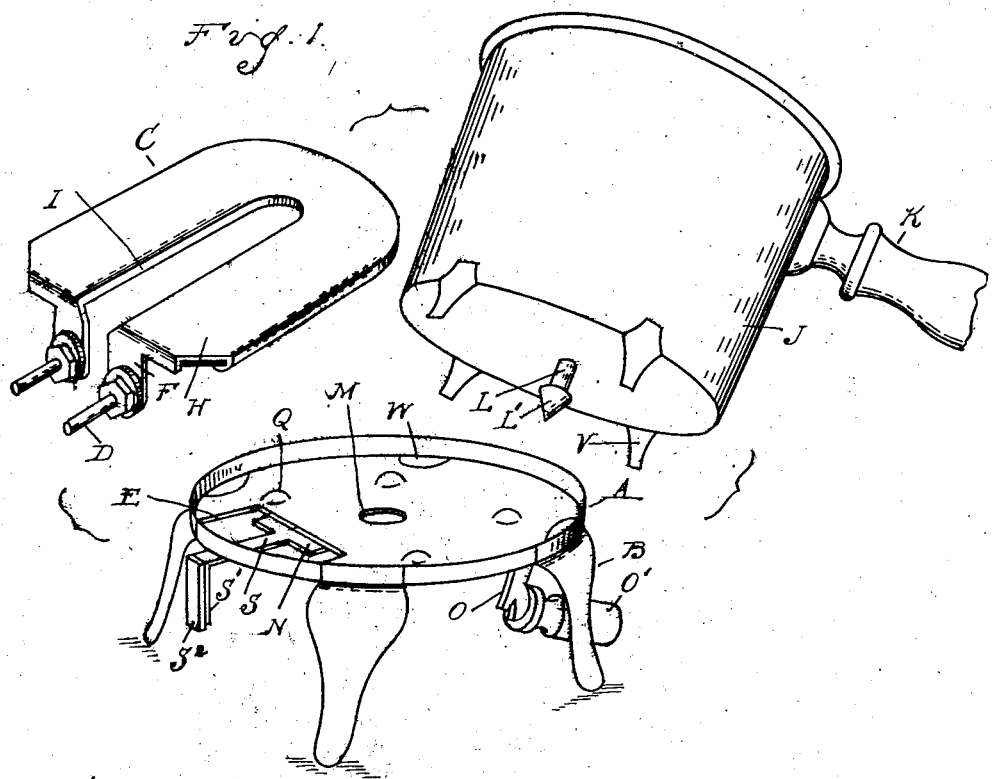
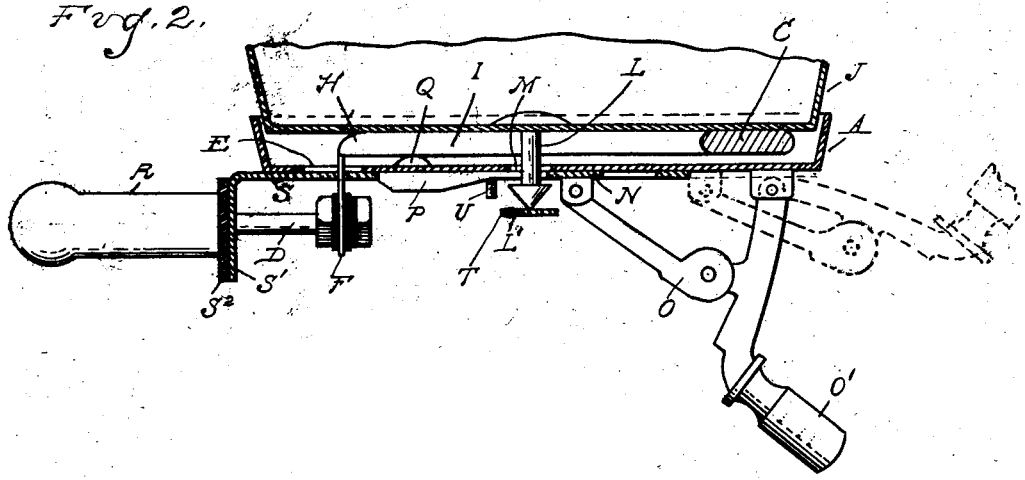
Witnesses
Inventors
Robert Kuhn
Frank Kuhn
Frank E. Shailor
By Whittemore Hulbert + Whittemore
Attys.

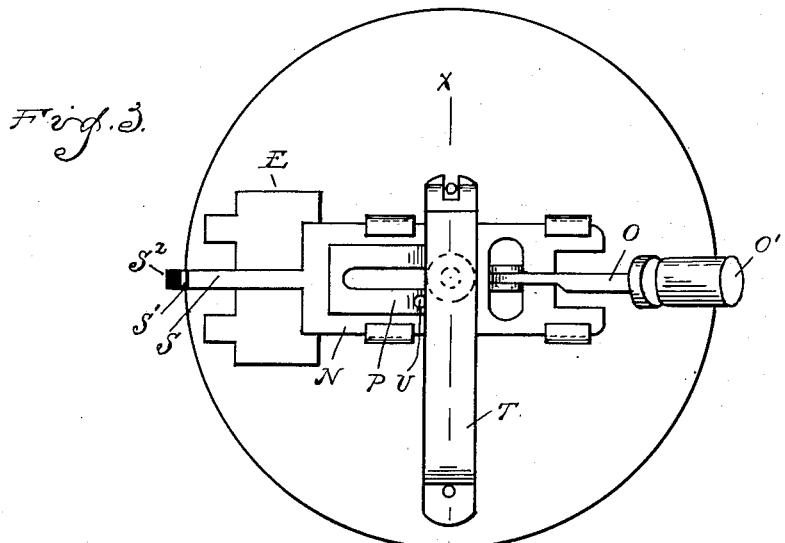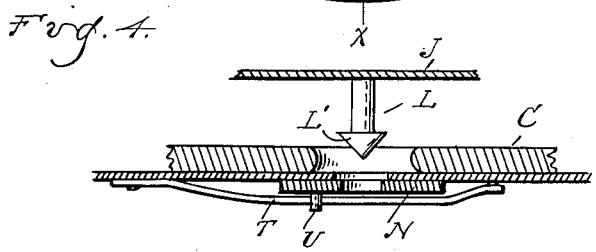

UNITED STATES PATENT OFFICE.

ROBERT KUHN, FRANK KUHN, AND FRANK E. SHAILOR, OF DETROIT, MICHIGAN, ASSIGNORS TO AMERICAN ELECTRICAL HEATER COMPANY, OF DETROIT, MICHIGAN A CORPORATION OF MICHIGAN.

ELECTRIC HEATER.

1,006,104.  Specification of Letters Patent.  Patented Oct. 17, 1911.

Application filed June 11, 1910. Serial No. 566,399.

*To all whom it may concern:*

Be it known that we, ROBERT KUHN, FRANK KUHN, and FRANK E. SHAILOR, citizens of the United States of America, residing at Detroit, in the county of Wayne and State of Michigan, have invented certain new and useful Improvements in Electric Heaters, of which the following is a specification, reference being had therein to the accompanying drawings.

The invention relates to electric heaters, particularly designed for use in the boiling of water or the cooking of food and similar purposes.

It is one of the objects of the invention to provide means for readily detaching the vessel containing the material to be heated, and at the same time to maintain said vessel in good heat conducting contact with the heating unit during operation.

It is a further object to prevent the burning out of the unit by automatically cutting out the circuit when the vessel is removed.

With these and other objects in view, the invention consists in various features of construction as hereinafter set forth.

In the drawings—Figure 1 is a perspective view of the heating unit and its supporting stand, and the vessel for containing the material detached from each other. Fig. 2 is a vertical central section showing the parts in assembled position, but unlocked ready for detachment. Fig. 3 is a bottom plan view of Fig. 2. Fig. 4 is a central section at right angles to Fig. 2 and substantially on line $x$—$x$ Fig. 3.

A is a suitable supporting stand preferably formed of sheet metal and provided with legs B.

C is the heating unit of the flat disk type which is adapted to fit upon the stand A and is provided with terminals D which project downward through an aperture E in the stand at one side thereof. These terminals D are mounted upon and insulated from downward projections F of the outer sheath or arm H which incases the heating unit, said sheath and unit being centrally slotted longitudinally at I.

J is the vessel for containing the material to be heated, being of any suitable construction adapted to fit upon the stand A. As shown, this vessel is provided with a laterally projecting handle K by which it may be engaged with or removed from the stand. For securing this vessel on the stand and in good heating conducting contact with the unit, mechanism is provided preferably of the following construction.

L is a pin depending from the bottom of the vessel J and passing through a registering aperture M in the bottom of the stand. The lower end of this pin is provided with a shoulder head L' with which a sliding keeper N on the stand is adapted to engage. This keeper is operated by a toggle O having an operating handle O' and is also provided with a cam or wedge shaped portion P which engages with the head L' of the pin L. The arrangement is such that by moving the handle O', the cam P will draw downward upon the pin L, clamping the bottom of the vessel J firmly against the heating unit C. To prevent loss of heat, the unit C rests upon a plurality of point bearings Q preferably struck-up from the bottom of the stand A, thereby reducing the heat conducting contact with said stand and also providing a heat insulating air space.

With the construction as thus far described, the apparatus may be used by placing the terminal contact plug R upon the contact members D which will establish electric circuit through the unit, the heat from which is conducted directly into the bottom of the vessel. After the completion of the heating, by moving the handle O', the pin L is unlocked which permits the removal of the vessel. It is however, desirable to insure the turning off of the current before the vessel is removed, as otherwise the heat generation would continue, and in the absence of work to perform the accumulative heat might soon burn out the resistance. This cutting-out of the circuit we accomplish automatically by mechanism coöperating with the unlocking mechanism for the pin L which disengages the plug R from the contacts D. As shown, S is an extension of the slide N which is provided with a downwardly extending arm S', preferably having an insulator face $S^2$. This arm S' extends between the contacts D and during the movement of the slide under the actuation of the handle O', said arm will press against the center of the plug R forcing it outward until free from the contacts D.

To facilitate the re-assembling of the parts, we provide means for holding the handle O' in the position of disengagement until the vessel J is again replaced upon the stand. This holding means consists of a resilient member T extending transversely beneath the slide N in the path of the pin L. When the vessel J is in position on the stand, the head L' of the pin L will displace the member T, but upon the removal of the vessel, said member T will spring upward into a position lying in the path of a pin U on the slide. The engagement of this pin U with the member T will prevent any movement of the slide so that the parts remain in the position of disengagement until the vessel is again replaced on the stand.

To permit of standing the vessel upon a table or other support when removed from the stand, lugs V of equal or greater length of the pin L are provided, these lugs being adapted to pass through apertures W in the stand when the vessel is engaged therewith.

What we claim as our invention is:

1. The combination with an electric heating unit, of a terminal contact mounted thereon, a coöperating terminal contact member for engaging the contact on said unit, a member to be heated, means for clamping said member to said unit, and a member connected with said clamping means movable in the path of said coöperating contact whereby upon the release of said clamp said coöperating contact is disengaged.

2. The combination with a stand, of an electric heating unit thereon, a member to be heated detachably supported upon said heating unit, means for clamping said member to be heated to said stand and against said unit and a detachable terminal adapted to contact with said heating unit only when said member to be heated is clamped to said stand.

3. The combination with a stand, of a flat electric heating unit supported thereon, a member to be heated detachably supported upon said unit, a member depending centrally from said member to be heated through a registering aperture in said unit, and means for clamping said depending member to said stand.

4. The combination with a stand, of a flat heating unit supported upon said stand and having terminal contacts depending beneath said stand, a member to be heated resting upon said unit, a depending member from said member to be heated passing through registering apertures in said unit and stand, a slide on the bottom of said stand having a locking and clamping engagement with said depending member, a detachable contact member engaging the contact on said unit, and a member on said slide for disengaging said detachable contact member upon the unclamping of said depending member.

5. The combination with a stand, of a flat central slot, electric heating unit resting on said stand, terminal contacts on said unit upon opposite sides of said slot, a contact plug detachably engaging said contacts, a member to be heated resting upon said unit and having depending pin passing through said slot, a slide on said stand for engaging said depending pin to clamp said member to said unit, and a member on said slide for disengaging said contact plug when said member is unclamped.

6. The combination with a stand, of an electric heating unit supported thereon, a member to be heated removably supported on said stand and contacting with said unit, a lever on said stand for locking said detachable member to the stand, a detachable contact engaging said unit, and means operated by said lever when releasing said member for disengaging said contact from said unit.

7. The combination with an electrical heating unit, of a member in heat conducting contact therewith but insulated therefrom, means for clamping said member to said unit, and means operated by the unclamping of said member for cutting out the electric circuit.

8. The combination with an electrical heating unit, of a member in heat conducting contact therewith but insulated therefrom, means for clamping said member to said unit, and means for preventing the closing of the circuit when said member is out of contact with said unit.

9. The combination with an electrical heating unit, of a member to be heated, and means for locking said member in heating contact with said unit, said means being constructed to cut off the circuit before permitting said member to be moved out of contact with the unit, and to prevent the closing of the circuit when said member is out of contact therewith.

In testimony whereof we affix our signatures in presence of two witnesses.

ROBERT KUHN.
FRANK KUHN.
FRANK E. SHAILOR.

Witnesses:
LEO PORDEN,
GEORGE S. TOWAR.